Aug. 30, 1955 E. F. GIBIAN 2,716,270
METHOD OF MAKING TURBINE BLADES
Filed Jan. 25, 1951 6 Sheets-Sheet 1
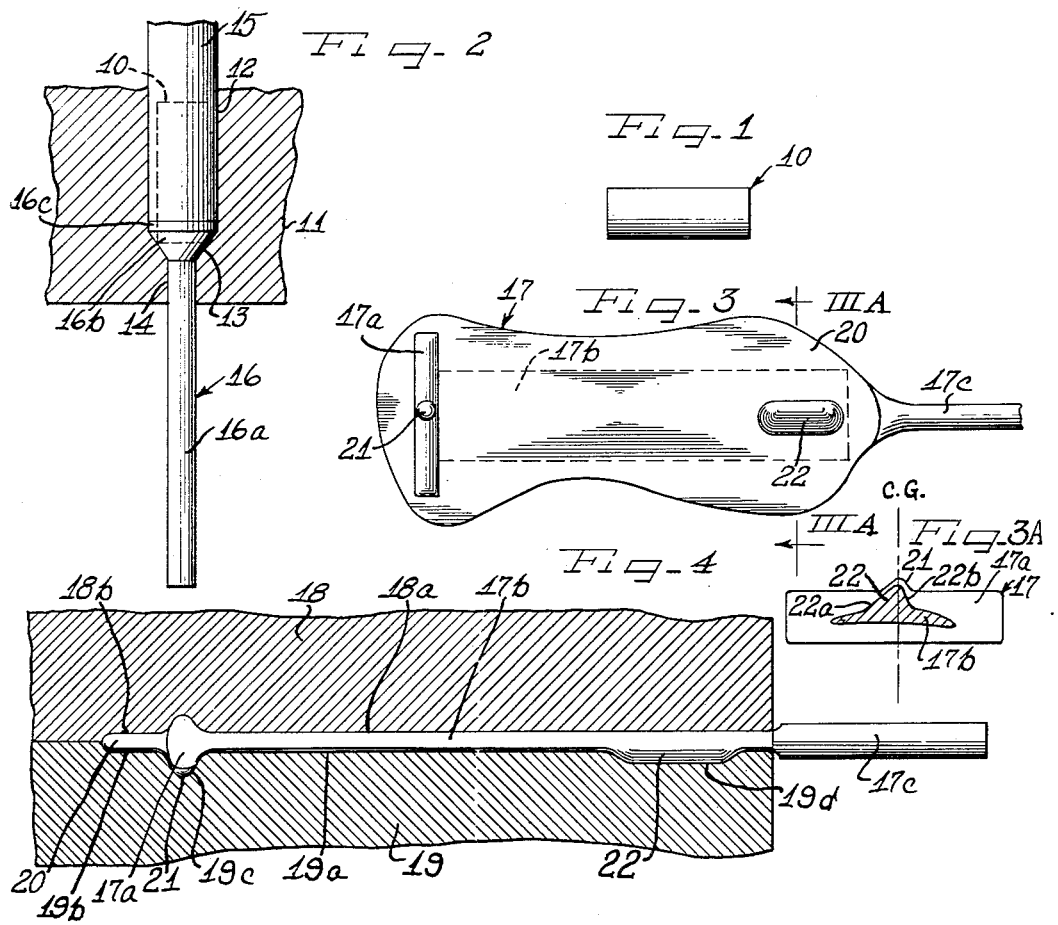
Inventor
Emil F. Gibian

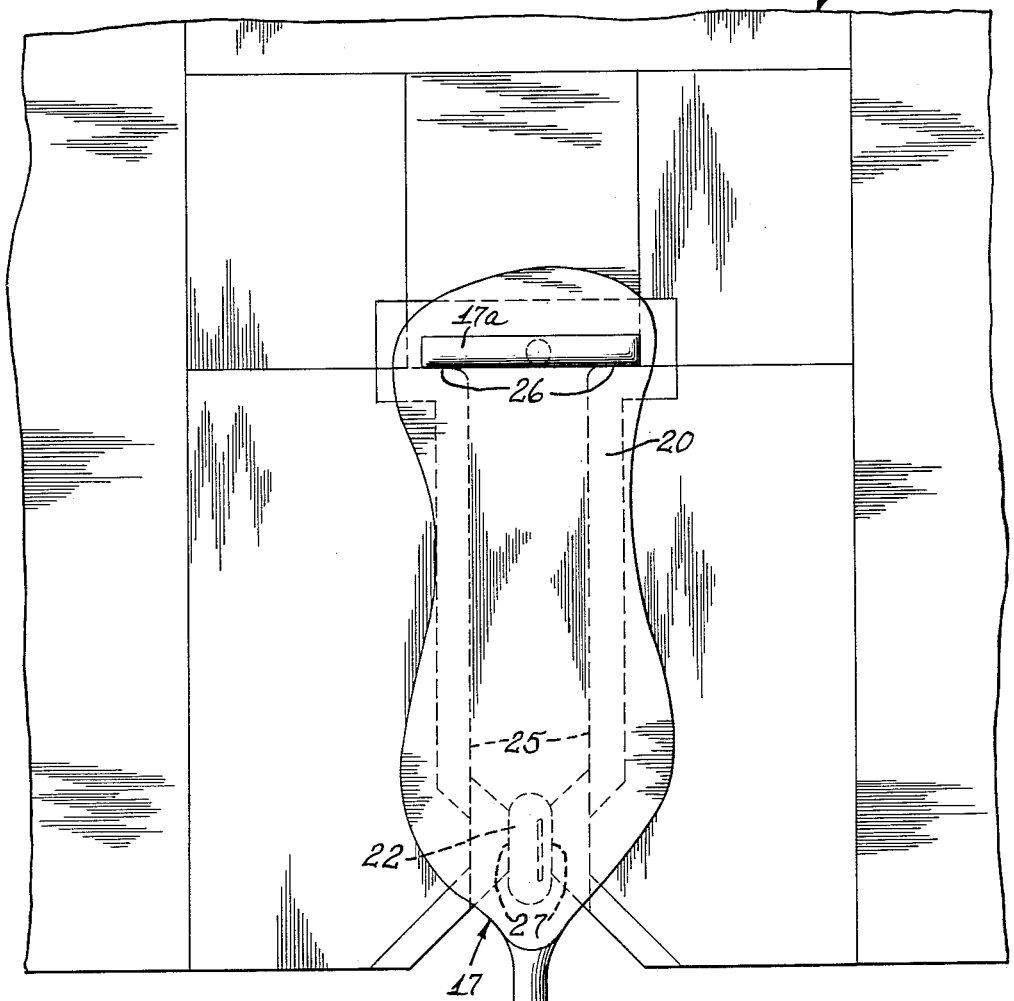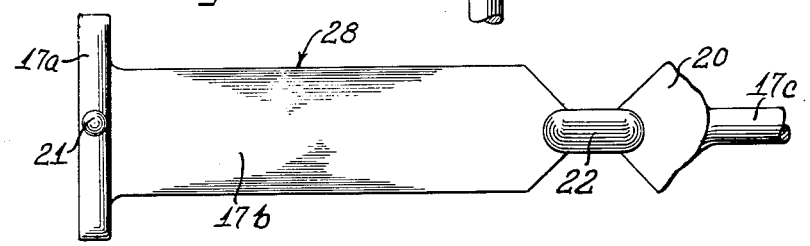

Aug. 30, 1955     E. F. GIBIAN     2,716,270
METHOD OF MAKING TURBINE BLADES
Filed Jan. 25, 1951     6 Sheets-Sheet 3
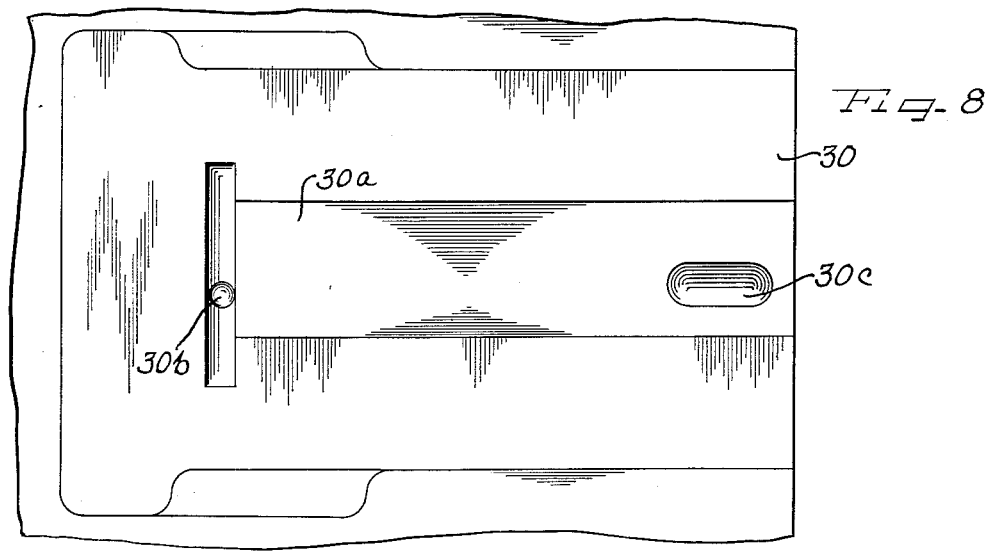
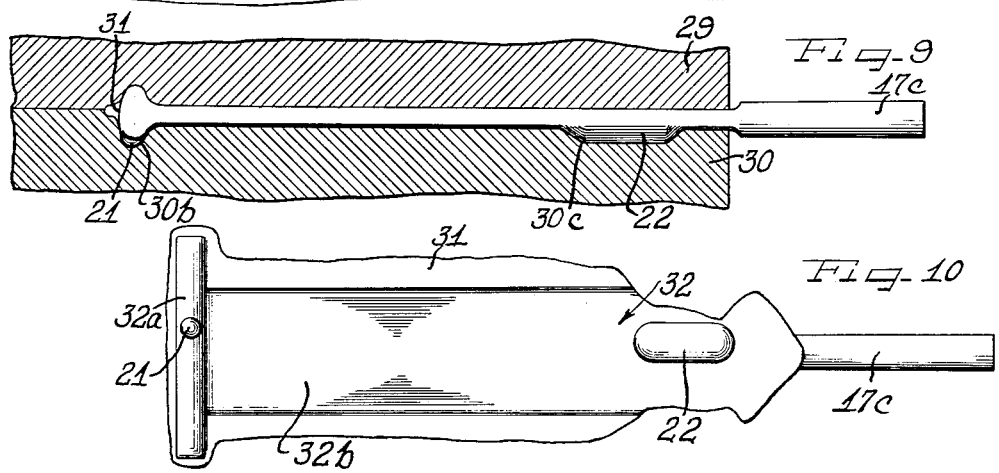
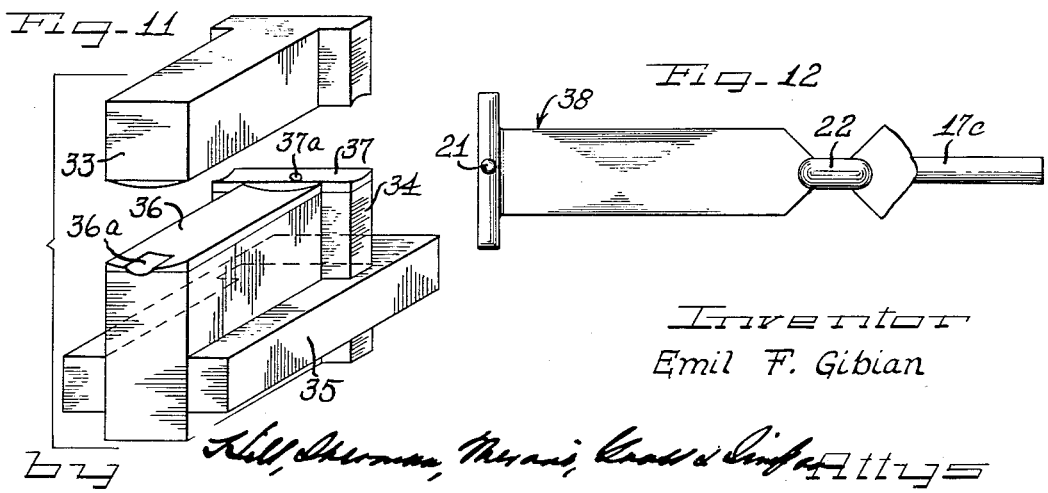
Inventor
Emil F. Gibian

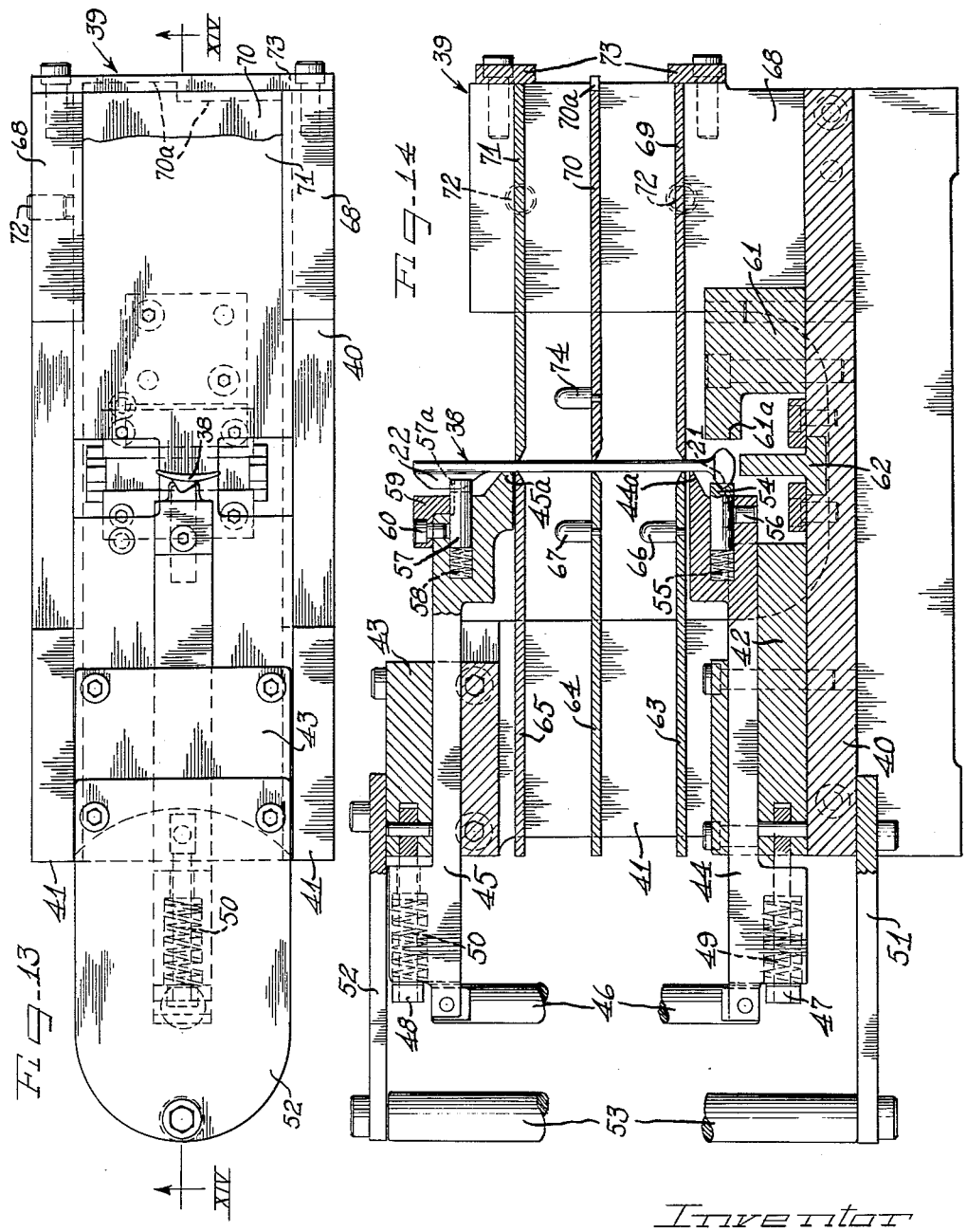

Aug. 30, 1955     E. F. GIBIAN     2,716,270
METHOD OF MAKING TURBINE BLADES
Filed Jan. 25, 1951     6 Sheets-Sheet 5
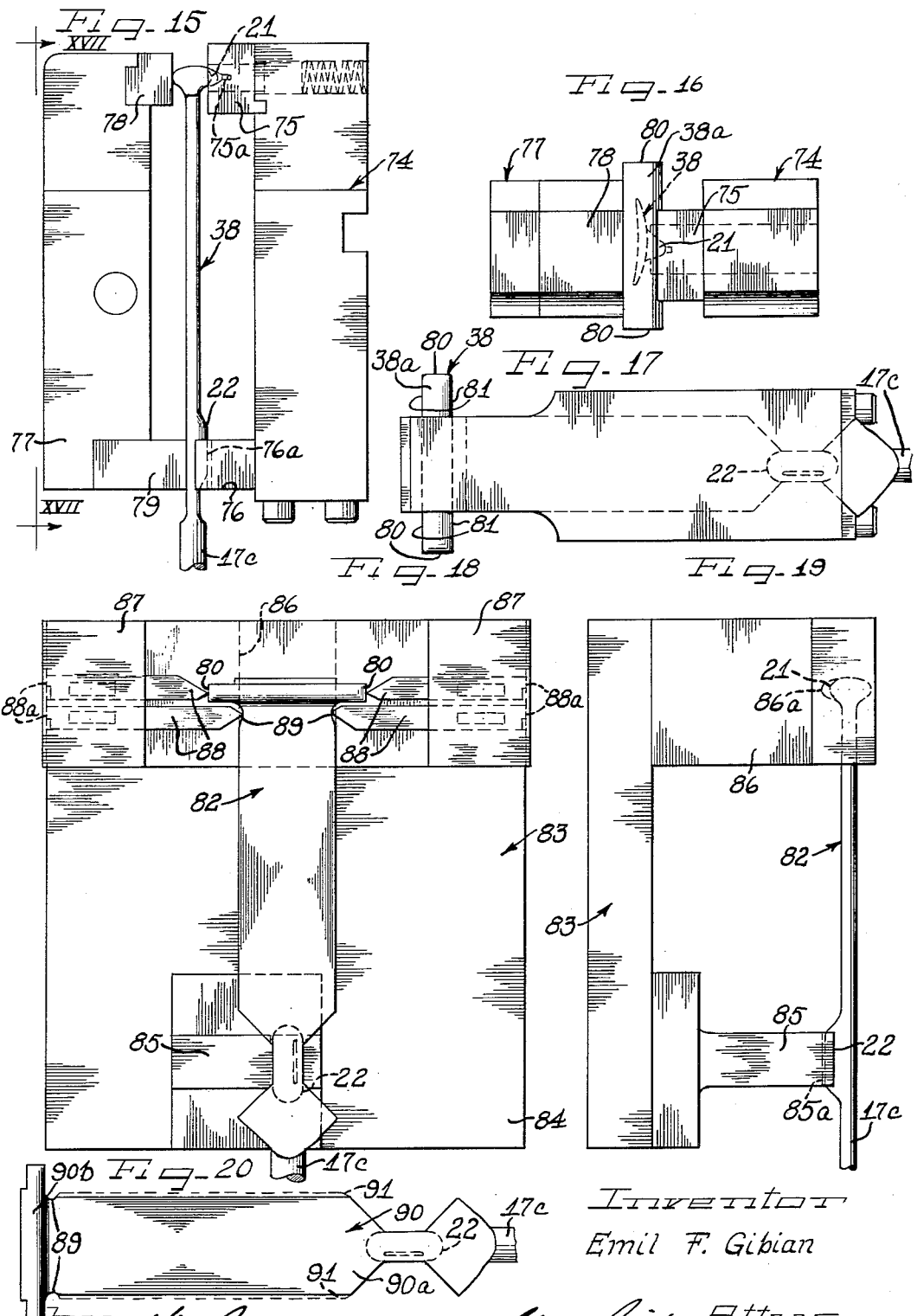
Inventor
Emil F. Gibian

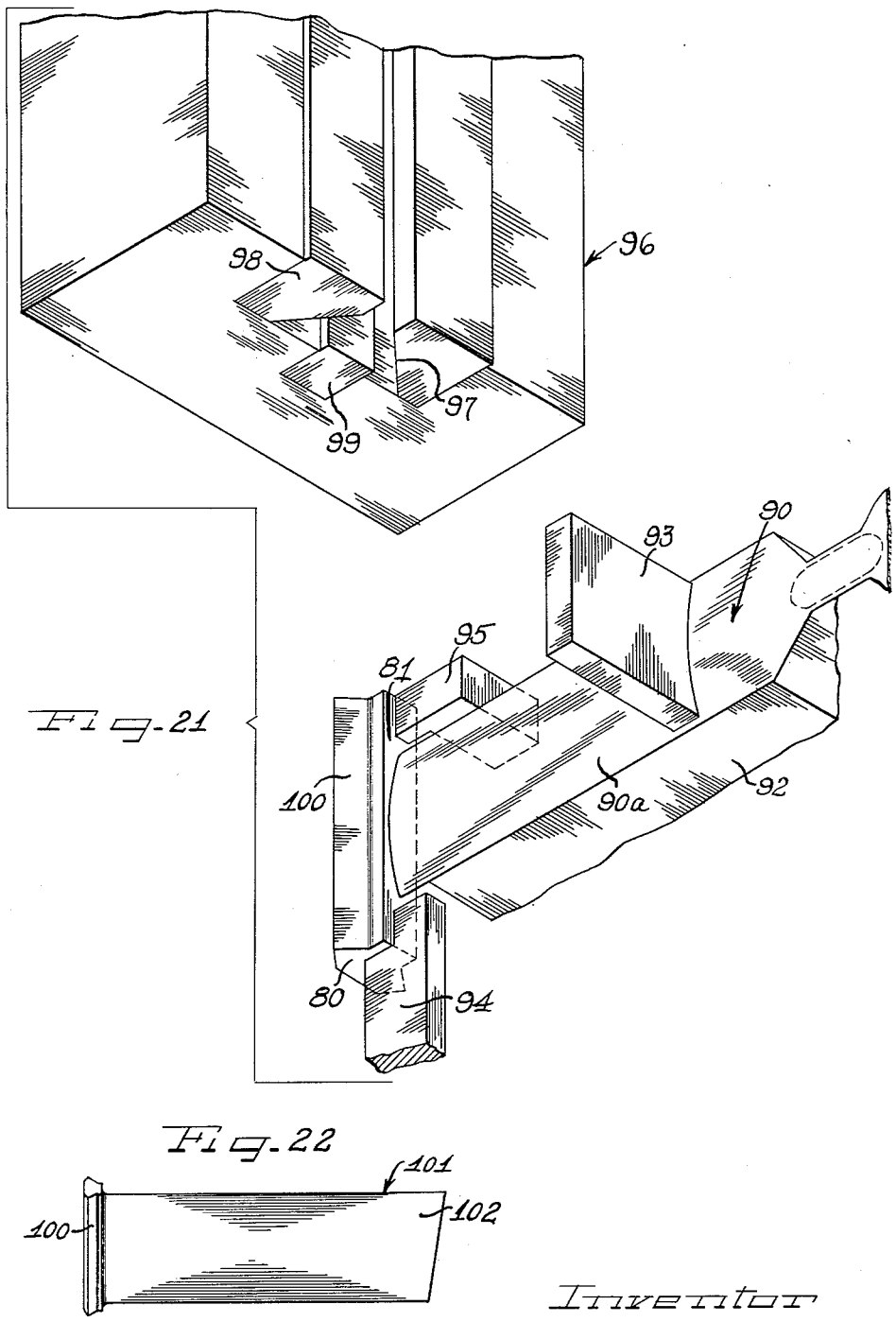

United States Patent Office 2,716,270
Patented Aug. 30, 1955

2,716,270

METHOD OF MAKING TURBINE BLADES

Emil F. Gibian, Cleveland Heights, Ohio, assignor to Thompson Products, Inc., Cleveland, Ohio, a corporation of Ohio Application January 25, 1951, Serial No. 207,739

1 Claim. (Cl. 29—156.8)

This invention relates to the production of blades for gas turbines and the like from slugs of metal by forging and machining operations which are measured and controlled from locating surfaces initially formed on the rough blade blank.

More specifically, this invention deals with the production of blades for turbine engines by forging and machining operations which are always measured from reference buttons integrally formed on the initial blade blank.

This invention includes the production of rotor and stator blades for axial flow compressors, as well as the production of buckets for turbine wheels of gas turbine engines. The term "turbine blade" as used herein will therefore be construed in its broader sense to include blades, buckets, and the like vaned members especially for directing fluids.

In accordance with this invention, a metal slug, preferably of cylindrical shape, is partially extruded to form a headed rod. The extruded piece is then blocked down between forging dies to produce a roughly shaped flattened blank with a transverse head portion at one end thereof, a flattened vane extending from the head portion, and an undeformed rod end on the terminus of the vane portion. Simultaneously with this blocking down operation, two buttons or protuberances are formed in spaced relation on one face of the blank for establishing a center line from which succeeding operations are gauged and controlled. One of these buttons is preferably of circular cross section and is located on the head end of the blank. The other button is elongated and provides inclined surfaces extending parallel with the longitudinal dimension of the blank. One of these surfaces is arranged to be aligned with the button on the head to prevent rotation of the blank about the axis of the head button. The blank from the block down operation is then gauged to determine whether or not it contains sufficient metal for completion of the blade. The gauging operation is based from the reference buttons. The gauged blocked down blank is then rough trimmed, coined, finish trimmed, and sized to correct shape. All of these operations are gauged from the reference buttons. An inspection then determines whether or not the resulting sized blank falls within the tolerance limits scheduled for production. The blank is then broached at its root end to form locating surfaces at the ends and faces of the root. During this broaching operation, the blank is again held in the fixture using the locating buttons for correct position of the blank. The broached surfaces that are formed by this operation thus form accurate locating reference surfaces and the function of the buttons on the root is thenceforth transferred to these newly developed locating surfaces. During the broaching operation, the fillet between the root and vane section is also broached. Following this operation, the blade is finish trimmed to form the air foil edges along the vane portion. The finish trimmed blade blank is then subjected to a dove-tail broaching operation utilizing the broached surfaces at the ends and faces of the root to accurately locate the dove-tail broach. The resulting dove-tailed blade is then trimmed to the desired vane length.

A feature of the invention therefore resides in the provision of a circular button on the root end of the initial blocked down blank and an elongated V-shaped button on the blank portion beyond the air foil vane section thereof. This V-shaped button has an extended locating surface that conveniently fits in a pocket in the various shaping dies and gauging instruments. Since both the circular button and the elongated V-shaped button are formed in the very first block down operation to produce the rough blank, there is no possibility for the locating surfaces or reference points to be out of position. The invention makes possible consistent mass production of very complicated air foil sections which not only vary in cross-sectional dimensions but also vary in pitch along their axial length. These sections are exactly specified by the designer to efficiently produce the results for which they have been designed, and heretofore, consistent results could only be produced with great difficulty involving skilled manual finishing.

It is, then, an object of the invention to provide a method for commercial production of complicated air foil shapes from metal slugs.

Another object of the invention is to provide a method of consistently producing accurately shaped and sized blades for gas turbine engines.

A specific object of the invention is to provide a method of commercially producing to very close tolerance limits mass quantities of gas turbine engine blades by forging and machining steps all of which are controlled from reference buttons simultaneously formed with the blade blank.

Another object of the invention is to provide a method of making blades for gas turbine engines and the like wherein a headed rod is flattened in block down dies and simultaneously with the flattening operation, a pair of locating buttons are formed from which all subsequent operations on the blank are controlled and gauged.

Another object of the invention is to provide longitudinally spaced integral reference buttons along the center of gravity axis of a blade blank and to control all subsequent operations on the blank from the surfaces produced by these buttons.

Other and further objects of the invention will be apparent to those skilled in the art from the following detailed description of the annexed sheets of drawings which, by way of a preferred example, illustrate the method of this invention and apparatus used in carrying out the method.

On the drawings:

Figure 1 is an elevational view of a cylindrical metal slug for forming the blades of this invention.

Figure 2 is a fragmentary elevational view, with a part in vertical cross section, illustrating how the slug of Figure 1 is partially extruded to produce a headed rod.

Figure 3 is a blocked down blade blank produced from the headed rod of Figure 2.

Figure 3A is a transverse cross-sectional view, with parts in elevation, taken along the line IIIA—IIIA of Figure 3.

Figure 4 is an enlarged vertical cross-sectional view, with parts in edge elevation illustrating the block down operation for producing the blank of Figures 3 and 3A.

Figure 5 is a plan view illustrating the gauging operation to determine whether or not the blank of Figures 3 and 3A contains sufficient metal to produce the desired blade.

Figure 6 is a top plan view of the blank of Figures 3 to 5 mounted in a trimming die and showing the manner in which the reference button is used to control the trimming operation.

Figure 7 is a plan view of the trimmed blank produced from the operation of Figure 6.

Figure 8 is a plan view of a coining die for receiving the trimmed blank of Figure 7.

Figure 9 is a vertical cross-sectional view, with parts in elevation, illustrating the coining operation in the die of Figure 8.

Figure 10 is a plan view of the coined blank produced in the dies of Figures 8 and 9.

Figure 11 is an isometric view of a set of trimming dies for cold coining and finish trimming the coined blank of Figure 10.

Figure 12 is a plan view of the finish trimmed blank produced in the dies of Figure 11.

Figure 13 is a plan view of a guillotine type gauging fixture for checking the various dimensions of the blank of Figure 12.

Figure 14 is a vertical longitudinal cross-sectional view taken along the line XIV—XIV of Figure 13, with parts in elevation.

Figure 15 is a vertical elevational view of a broaching fixture holding the blank of Figure 12 in position for broaching the ends and end faces of the root portion of the blank.

Figure 16 is a top plan view of the assembly of Figure 15.

Figure 17 is a side elevational view taken along the line XVII—XVII of Figure 15.

Figure 18 is a plan view of the broached blank produced from the operation illustrated in Figures 15 to 17 mounted in a gauging fixture.

Figure 19 is a side elevational view of the gauging fixture of Figure 18.

Figure 20 is a view of a finish trimmed blank illustrating the manner in which the edges of the vane section are trimmed down after the fillet broaching operation.

Figure 21 is an isometric view of the dove-tail broaching operation for the root of the blade illustrating the manner in which the operation is gauged from the broached surfaces produced in the operation of Figures 15 to 17.

Figure 22 is a plan view of a finished blade produced according to this invention.

As shown on the drawings:

As shown in Figures 1 and 2, a cylindrical metal slug 10 composed of an alloy suitable for forming gas turbine blades, is placed in an extruding die 11 having a cylindrical die hole 12 of larger diameter than the slug 10. The die hole extends to a conical throat 13 which converges to a small diameter cylindrical outlet passage 14. A plunger 15 snugly fitting the hole 12 is pressed on top of the slug 10 to force the slug partially through the extrusion throat 13 to form a headed rod 16. The rod 16 has a solid cylindrical elongated rod portion 16a of the same diameter as the outlet passage 14 and a conical head 16b conforming with the tapered throat 13 of the die. The head 16b has a cylindrical top rim portion 16c of the same diameter as the hole 12. The divergent end of the head is therefore of larger diameter than the original slug 10.

The headed rod 16 is blocked down to produce a flattened blank 17 shown in Figures 3 and 4 by means of block down dies 18 and 19 shown in Figure 4. The blank 17 has a transverse root portion 17a, a longitudinally extending vane portion 17b, and an undeformed rod end 17c. Flash metal 20 surrounds the flattened down portions 17a and 17b of the blank. The root portion 17a has a rounded circular button 21 formed on one face thereof intermediate the ends thereof. An elongated V-shaped button 22 is formed on the flattened vane portion 17b in spaced longitudinal relation from the button 21. As shown in Figure 3A, the elongated V-shaped button 22 has an inclined surface 22a forming a face of appreciable size. This surface is opposed by a steeper inclined face 22b.

The line C. G. of Figure 3A illustrates the center of gravity axis of the blade to be formed from the blank 17 and it will be noted that the buttons 21 and 22 have their apices on this axis which may or may not be spaced from the longitudinal center line of the blade. Thus, the buttons are so positioned that the transverse mass of blank material is divided equally on each side of each button. The two buttons cooperate to form a datum axis for the blank.

As shown in Figure 4, the die 18 has a die face 18a shaped for forming the head 17a and the vane portions 17b of the blank 17 while a flash gutter portion 18b is provided to receive the flash metal 20. The bottom die 19 has a similar die face 19a to form the head and vane sections and a flash gutter 19b for the flash metal 20. In addition, the die 19 has a first recess 19c for forming the circular button 21 and a second recess 19d for forming the V-shaped button 22. It will be noted that the rod portion 17c projects freely from the dies 18 and 19 and affords a grip for operator's tongs (not shown).

The blank 17, as shown in Figure 5, is next gauged with a rectangular strip 23 to determine whether or not the root portion 17a and the vane portion 17b have flash metal 20 therearound sufficient so that the presence of ample metal will be insured for the subsequent blade forming operations. This device 23 is a gauge having a recess 23a therein to receive the circular button 21 and an elongated V-shaped recess 23b therein to receive the button 22. As shown in Figure 5, when the recesses in the gauge receive the buttons therein, the perimeter of the gauge is well within the confines of the flash metal 20 and therefore the blank 17 has sufficient metal in it to be used in producing the blades of this invention.

As shown in Figure 6, the blank 17 is next trimmed in a trimming die designated generally by the reference numeral 24. For the trimming operation, the blank is heated. The die 24 has a cavity with cutting edges therearound arranged to produce a rough outline of a blade. The flash metal 20 of the blank 17 overlies the die. As shown in dotted lines, the die has cutting edges 25 in spaced parallel relation to trim the blade portion of the blank along the longitudinal edges thereof. The die also has abutment surfaces 26 to receive the anchoring root head 17a thereagainst. An important feature of the die is the provision of spaced opposed abutment surfaces 27 to receive the button 22 in snug relation therebetween. A punch (not shown) coacts with the die to trim off the flash metal 20. The button 22 cooperates with the abutment surfaces 26 to receive the head 17a thereagainst so that no misplacement or misalignment of the blank in the die is possible.

As shown in Figure 7, a trimmed blank 28 is formed from the blank 17 in the hot trimming operation of the die of Figure 6. This blank 28 still retains the buttons 21 and 22 but the excess flash metal 20 has been removed. The tongs grip 17c still remains as illustrated. The head portion 17a and the vane portion 17b are unchanged. Some flash metal 20 may remain between the button 22 and the tongs grip 17c, but inasmuch as this portion of the blank is later trimmed off, no shaping of this area is necessary.

As shown in Figures 8 and 9, the hot trimmed blank 28 of Figure 7 is next subjected to a warm coining operation in dies 29 and 30. The bottom die 30, as best shown in Figure 8, has a main die cavity 30a with recesses 30b and 30c to receive the buttons 21 and 22 of the blank 28. A flash gutter surrounds the main cavity 30a to receive flash metal 31 such as shown in Figure 9. These recesses 30b and 30c coact with the button to fixedly align the blank in the dies so that when the top die descends on the blank an accurate coining will be effected. As shown in Figure 10, a coined blank 32 is formed from the coining dies of Figures 8 and 9 and this blank has its root or head portion 32a and its vane portion 32b surrounded by the flash metal 31. The buttons 21 and 22 are undeformed and the tongs grip portion 17c of the original blank still remains intact.

The blank 32 is next subjected to a cold coining and trimming operation in the die shown in Figure 11. As therein shown, a top coining die and punch 33 has a bottom face for coacting with the top face of the blank 32. A bottom coining die and support 34 slides through a cutter 35 and has a top face equipped with a vane receiving portion 36, and a head receiving portion 37. A recess 36a is provided in the portion 36 to receive the button 22 while a recess 37a is provided in the head portion to receive the button 21. The blank 32 is seated on the portions 36 and 37 with the buttons in the recesses. The punch then descends on the blank and slides the member 34 through the cutters 35 to trim off the flash metal 31 and to cold coin the blank 38 of Figure 12.

The dies 33 and 34 coact prior to the trimming operation to size the air foil and further shape the same within the desired tolerance limits. Therefore the blank 38 has a sized air foil section and is accurately trimmed.

After the sizing operation, the blank 38 is inspected in a guillotine-type gauge 39 shown in Figures 13 and 14. This gauge has a base 40, and a pair of upstanding opposed plates 41, 41 provided on one end of the base 40. A slide plate 42 is mounted on the base 40 between these plates 41. A top slide plate 43 is carried on the plates 41 at the top ends thereof and spans the space between the plates. A bottom slide 44 and a top slide 45 are respectively slidably mounted through the plates 42 and 43 in slideways afforded thereby. The rear ends of these slides 44 and 45 are connected through a handle 46. Bolts 47 and 48 anchored to the plates 42 and 43 respectively slidably fit through the rear ends of the slides 44 and 45 and compression springs 49 and 50 are disposed between the heads of the bolts and the slides. These springs urge the slide assembly forwardly in the slides.

Bars 51 and 52 are anchored to the base 40 and to the top plate 43 respectively and project rearwardly therefrom. A handle 53 connects the plates and is aligned with the handle 46. When both handles 46 and 53 are gripped by an operator the handle 46 is easily drawn toward the handle 53 to compress the springs 49 and 50 and retract the slide assembly rearwardly.

The forward end of the slide 44 has a nose 44a forming an abutment for the blade blank 38. This nose slidably supports a plug 54 which is spring pressed by a spring 55 against the root of the blade blank. The forward end of the plug is notched to conform with the shape of the root. A pin 56 intersects the bore of the nose to seat in a groove in the plug 54 for preventing the plug from being removed from the nose piece.

A similar nose 45a is provided on the forward end of the slide 45 to form an abutment for the blade blank 38. This nose carries a plug 57 slidable in a well thereof and impelled by a spring 58. A notched end on the plug receives the button 22 of the blade blank. A groove 57a is formed in the plug and a retainer 59 held on the nose piece by a screw 60 seats in the groove to prevent removal of the plug from the nose piece.

The plugs 54 and 57 are therefore slidably mounted on the slide assembly and have recesses for receiving the buttons of the blade blank 38.

The base 40 carries a guide block 61 with a nose 61a opposing the plug 54 in spaced relation to coact therewith in forming a gap therebetween which will accommodate the root end of the blade blank. A support 62 is also mounted on the base 40 on which the root end of the blade blank may rest until the buttons are seated in the recesses of the slidable plugs.

Three superimposed slide plates 63, 64, and 65 are slidably mounted on the inner faces of the plates 41 and span the space therebetween to project forwardly between the nose ends 44a and 45a of the slide assembly. Pins 66 and 67 on the plates 63 and 64 respectively afford handles for sliding the plates.

A second pair of upstanding plates 68 are mounted on the base 40 at the end thereof remote from the plate 41. These plates have grooves slidably mounting superimposed gauge plates 69, 70, and 71. Set screws 72 in an upstanding plate 68 urge plugs against the plates 69 and 71 to retain these plates against sliding. Back stops 73 are also provided to abut the rear ends of the plates 69 and 71.

The middle plate 70 has a pin 74 thereon to afford a handle for sliding the plate. The rear end of the plate has a stepped rear edge 70a as shown in Figure 13 so that the alignment of this plate relative to the rear ends of the plates 69 and 71 can be quickly determined.

The guillotine gauge operates by gripping the handle 46 and retracting the slide assembly so that the blade 38 can have the root end thereof deposited on the support 62. The handle 46 is then released, whereupon the springs will urge the slide assembly to move the plugs 54 and 57 against the button portions of the blade blank. The blade is lifted to seat the button 21 in the plug 54. The rigid blades 65, 69, and 70 have forward edges conforming with the air foil section desired for the blade at the levels being measured. Check is made to determine whether or not the blade conforms with the shape of these plates. The sliding plates 63, 64, and 70 are then manipulated by the pins 66, 67, and 74 to move the forward edges of these plates against the blade and to check the conformity between these forward edges and the blade at the levels being measured.

The guillotine gauge therefore affords a quick method of determining the blade shape and dimensions. In this inspection operation the buttons again play the important role of properly seating the blade in the measuring device.

After the inspection in the guillotine gauge 39, the blade 39 is placed in a broaching fixture for finishing the ends of the root, the end side faces of the root, and the fillet between the root and vane. As shown in Figures 15 to 17, the blank 38 is located in a broaching fixture by means of the locating buttons 21 and 22 thereon. The fixture includes a support 74 with pads 75 and 76 therein respectively having recesses 75a and 76a receiving the buttons 21 and 22 of the blank 38. A pressure coacting member 77 has pads 78 and 79 for engaging the opposite face of the blank 38 at the button areas to hold the blade in fixed position. As best shown in Figures 16 and 17, the root end 38a of the blank has end faces 80 and side faces 81 exposed for a broaching tool. In addition, the fillet areas between the vane and anchoring root on each edge of the vane are exposed for the broaching tool. The broaching tool (not shown) therefore finishes the ends, the side faces, and the fillets of the blank 38, while the blank 38 is held in the fixtures illustrated in Figures 15 to 17. The ends 80 and the inner faces 81 are in right angle relation and, as hereinafter described, form accurate positioning abutments.

As shown in Figures 18 and 19, the blank 82 produced by the broaching operation illustrated in Figures 15 to 16 is next gauged in a gauging fixture 83. This fixture includes a base 84 on which is mounted an upstanding pedestal 85 with a recess 85a in its upper face for receiving the button 22 of the blank 82. A second pedestal 86 on the base 84 receives the root end of the blank 82 and has a recess 86a in its upper face receiving the button 21 on the root of the blank. This pedestal 86 is flanked by upright guides 87 slidably supporting gauges 88 adapted to respectively engage the broached ends 80 and the broached fillet 89 of the blank. These feeler gauges 88 have stepped outer ends 88a adapted to be aligned with the outer face of the uprights 87 to determine the distance between the points of the gauges and thereby indicate the dimensions of the anchor root length and the fillet width.

The gauged blank 82 is next trimmed along the leading and trailing edges of the vane portion thereof as shown in Figure 20 to produce a finished trimmed blank 90. This blank, as shown by the dotted lines 91, has material from the leading and trailing ends of the vane portion 90a thereof cut down to the bottom of the fillets 89. The trimming operation can be gauged from the buttons or from the button 22 and the broached faces. The root end 90b of the blank has the broached ends and side faces.

The trimmed blank 90 is next subjected to a dove-tail broaching operation as shown in Figure 21. In this operation, the vane portion 90a of the blank is seated on a support 92 and held thereagainst by a clamp 93. The blank is positioned correctly by seating a broached end face 80 of the root against a bottom stop 94 and by pulling the broached face 81 against an upper stop 95. The root is thereby accurately positioned by utilization of the broached surfaces which surfaces, in turn, were accurately formed by utilization of the buttons.

The broaching tool 96 has a plurality of cutter blocks 97, 98, and 99 therein which cooperate to form a dove-tailed root end 100 on the blank 90.

The vane section 90a of the blank 90 is then cut to the desired length and a finished blade 101, shown in Figure 22, is thereby produced. This blade 101 has an air foil section 102 of desired length and a root section 100 with dove-tailed cross section along its length.

From the above descriptions it will therefore be appreciated that this invention provides a method whereby very complicated shapes can be accurately positioned in fixtures for forging, machining, and gauging operations by the utilization of locating buttons which are initially formed on the original blank to produce the forged article. The invention deals particularly with blades for gas turbine engines having air foil vane portions of complicated contour extending along their length and anchoring root ends of accurate dimensions for mounting in a stator or rotor element.

The preferred locating buttons include a first button of circular cross section located on the root of the blade blank and a second button of longitudinally elongated V-shape located on the vane portion of the blade blank beyond the portion thereof to be used as a fluid directing foil. The V-shaped button has an inclined abutment surface of appreciable size which drops easily into a recess to be held firmly against a coacting recess face by the action of an opposed face. The V button, when seated, prevents rotation of the blade about a center determined by the first button. The two buttons should be on a selected center line preferably coincidental with the axis of the center of gravity for the blade.

It will be understood that modifications and variations may be effected without departing from the scope of the novel concepts of the present invention.

I claim as my invention:

The method of accurately making turbine blade blanks for gas turbine engines which comprises die forging a headed rod to form an elongated blade blank, said blade blank comprising a root portion at one end, a grip portion at the other end, and an air foil portion between said ends, simultaneously with the die forging operation forming a pair of buttons on one face of the blank, one adjacent each end thereof and each located transversely on the blank so that the transverse mass of blank material is divided equally on each side of the button, said buttons cooperating to form a datum axis for the blank, heating the blank, locating the heated blank in a trimming operation by the use of the buttons, hot trimming the blank, locating the blank in a coining die by the use of buttons, said die having cavities of substantially the same but smaller shape than the die forged blank, coining the heated blank in said die, locating the blank in a trimming operation by the use of the buttons, cold trimming the blank, locating the blank in a second coining die by the use of the buttons, said second coining die having cavities of substantially the same but smaller shape than the blank leaving the first coining die, and cold coining the blank in said second coining die.

References Cited in the file of this patent
UNITED STATES PATENTS

| | | |
|---|---|---|
| 1,430,398 | Parsons et al. | Sept. 26, 1922 |
| 2,169,894 | Criley | Aug. 15, 1939 |
| 2,373,827 | Halford et al. | Apr. 17, 1945 |
| 2,577,747 | Gibian | Dec. 11, 1951 |

FOREIGN PATENTS

| | | |
|---|---|---|
| 569,514 | Great Britain | May 28, 1946 |